No. 858,541. PATENTED JULY 2, 1907.
G. I. ROCKWOOD.
MEANS FOR MAKING STRUTS FOR AUTOMATIC SPRINKLERS.
APPLICATION FILED DEC. 12, 1906.
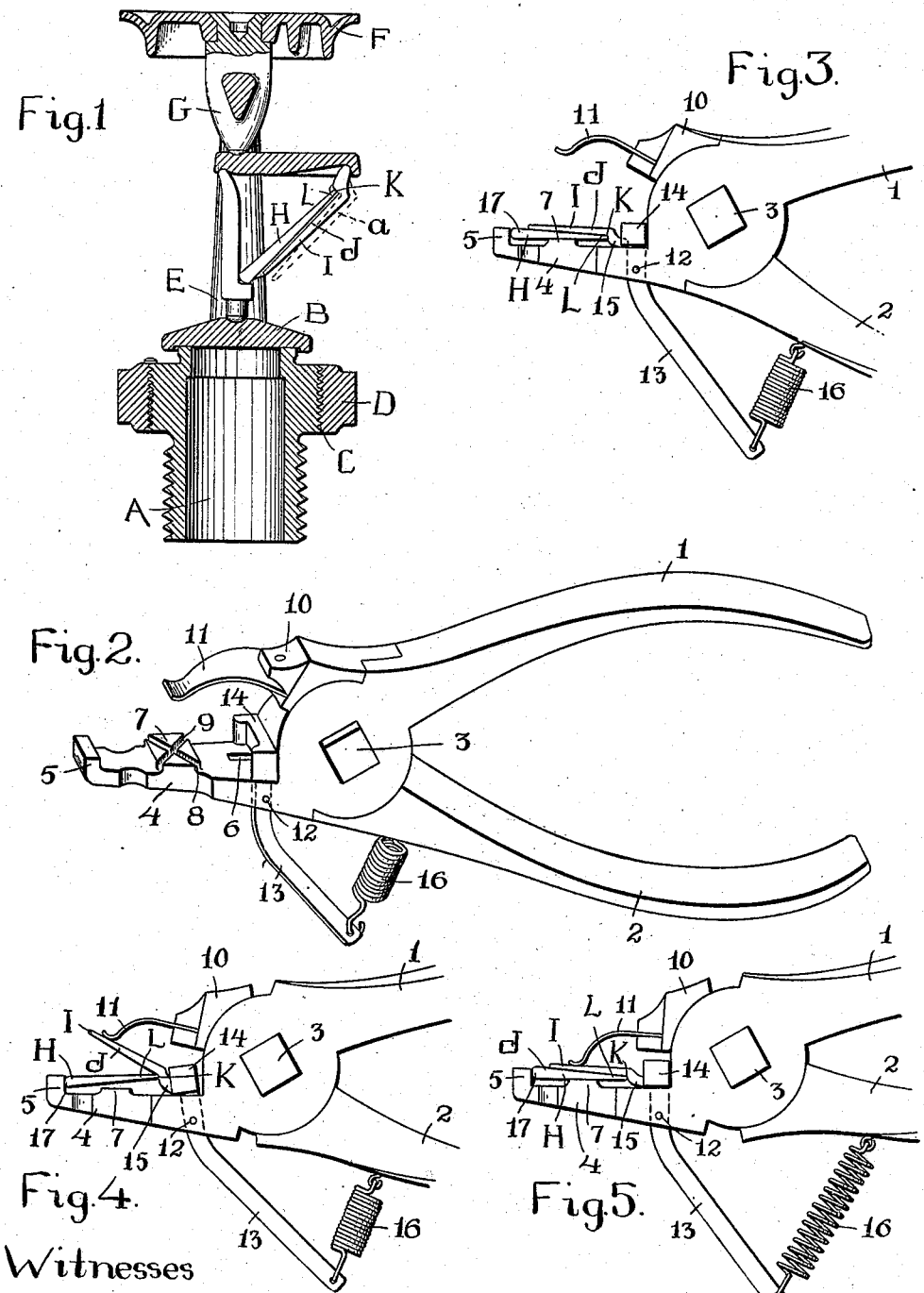
Witnesses
R. O. Tolman.
Penelope Comberbach.
Inventor
George I. Rockwood.
By Rufus B. Fowler
Attorney

UNITED STATES PATENT OFFICE.

GEORGE I. ROCKWOOD, OF WORCESTER, MASSACHUSETTS.

MEANS FOR MAKING STRUTS FOR AUTOMATIC SPRINKLERS.

No. 858,541.   Specification of Letters Patent.   Patented July 2, 1907.

Application filed December 12, 1906. Serial No. 347,565.

*To all whom it may concern:*

Be it known that I, GEORGE I. ROCKWOOD, a citizen of the United States, residing at Worcester, in the county of Worcester and Commonwealth of Massachusetts, have invented a new and useful Improvement in Means for Making Struts for Automatic Sprinklers, of which the following is a specification accompanied by drawings, forming a part of the same, in which—

Figure 1 is a vertical section of an automatic sprinkler showing a strut in position. Fig. 2 is a perspective view of the tool used for holding the two parts of the strut preparatory to their union by solder. Fig. 3 is a side view of the same opened and showing the strut placed therein. Fig. 4 is the same showing the tool partially closed. Fig. 5 is the same showing the tool in its closed position, holding the strut under pressure and ready for the application of the soldering iron.

Similar reference letters and figures refer to similar parts in the different views.

My invention relates to a means for holding in the desired position for soldering, the two parts of a strut which are to be used in an automatic sprinkler, and are designed to be united by fusible solder, and to separate at a predetermined degree of heat, and it consists in the construction and arrangement of parts as hereinafter described and pointed out in the annexed claims.

Referring to the accompanying drawings Fig. 1 shows an automatic sprinkler having an inlet pipe A closed by a cap B. Adjustably attached to the upper end of the pipe by screw threads C is a collar D which supports by arms E the sprinkler top F. Depending from the top F is a boss G, between which and the cap B is a device which normally resists the pressure of the water in the inlet pipe, but which is designed to give way when a certain degree of heat is attained and thus release the cap B. This is accomplished by the parting, as shown by the dotted lines *a*, Fig. 1, of the two members H and I of the strut J. These two members are joined by solder fusible at the degree of heat at which it is desired that the sprinkler shall operate, and my invention has for its object to provide means for holding the two members H and I in the proper position to be heated by a soldering iron and their union accomplished.

It is seen in Fig. 1 that the member I of the strut is provided with a shoulder K which receives the upper end L of the member H and that when the solder is melted the members H and I separate on the upper end of the member H as a fulcrum, as shown by the dotted lines *a*, Fig. 1. This insures the instant collapse of the cap retaining device as soon as the solder is melted sufficiently to be overbalanced by the force exerted by the water on the cap B, and also since the solder is applied to the long arm of the lever like member I, this construction makes a small amount of adhesion sufficient to resist the force of the water, thereby rendering the separation certain when the predetermined degree of heat is reached, and also providing for the integrity of the device until the exact degree of heat is attained.

In my improved mechanism for making struts, 1 and 2 are decussated arms pivoted at 3, the arm 1 being provided with a lower jaw 4, upturned at its outer end 5 and provided with a slot 6 near the pivot 3. Midway between the upturned end 5 and the slot 6 is a boss 7 upon which member H of the strut is held and which is cut away by slots 8 and 9 to decrease the heat receiving surface in contact with the member H. The upper jaw 10 on the arm 2 is provided with a blade 11 which upon closing the jaws contacts with the member I placed on the member H. This blade 11 is reduced in thickness also to decrease the heat receiving surface in contact with the member I.

Inserted in the slot 6 and mounted on a pivot 12 is a lever 13, the upper end of which is provided with a block 14 arranged to receive the short arm end 15 of the member I resting on the member H. The other end of the lever 13 is attached to the arm 2 by a spiral spring 16.

The operation of my improved device is as follows:—The two members H and I of the strut J to be soldered, having previously been "tinned", are placed in the device in the position shown in Fig. 3, that is, with the member H in contact with the boss 7 and with its end 17 in contact with the inside of the upturned arm 5. The member I is placed on the member H with its shoulder K abutting against the end L of the member H and the short arm 15 held in contact with the block 14 on the upper arm of the lever 13. When the jaws 4 and 10 are open the spring 16 acts as a rod to keep the block 14 at its greatest distance from the end 5, thereby allowing the members H and I to be placed in position. The arms 1 and 2 are then brought together, reaching first the position shown in Fig. 4 where the member I has been rocked on the end L of the member H by the forward movement of the block 14 until the member I contacts with the descending blade 11. This rocking of the member I exerts a longitudinal pressure on the member H and insures that complete contact between the end L of the member H and the shoulder K of the member I, which is necessary for the accurate and rapid separation of the members H and I when the solder is melted, as has been previously explained.

Fig. 5 shows the position assumed by the various parts when the arms 1 and 2 have been brought together, in which the members H and I are again in contact by the depression of the member I by the blade 11 and the expansion of the spiral spring 16, which exerts a longitudinal pressure on the members H and I, thereby keeping them in contact. The members H and I are now heated by any convenient means, and the solder upon them, resulting from the "tinning" process, is melted, thus uniting the members H and I when the solder cools, thereby forming the strut J.

I have shown my invention embodied in a device having pivoted arms and exerting the necessary amount of pressure by jaws which are brought together by said arms. I do not wish to confine myself to this device, however, as any means of supporting the member H with the member I upon it, applying longitudinal pressure to the members H and I, and applying a pressure at right angles with the plane of support of the member H, would be within the spirit of my invention.

I claim,

1. In a device for making struts for automatic sprinklers, the combination with a support for one member of a strut, means for exerting a pressure at right angles to the plane of said support upon the other member of the strut in contact with said first member, and means for exerting a longitudinal pressure on both members of said strut.

2. In a device for making struts for automatic sprinklers, the combination of the following; a support for said strut, means for exerting a pressure on said strut at right angles to the plane of said support, and means for exerting a longitudinal pressure on said strut.

3. In a device for making struts for automatic sprinklers, the combination of the following; a support for said strut, means for holding the members of said strut in contact on said support, and means for exerting a longitudinal pressure on said strut.

4. In a device for making struts for automatic sprinklers, the combination of the following; a support for one member of said strut, means in contact with one end of said member for preventing the longitudinal movement of said member in that direction, and means for holding the other member of the strut in contact with the opposite end and upper side of said first member.

5. In a device for making struts for automatic sprinklers, the combination with a support for said strut, a stop for one end of said strut, a movable block in contact with the opposite end of said strut, means for exerting a pressure on said strut at right angles to the plane of said support, and means for increasing the distance between said stop and said block when said pressure is withdrawn.

6. In a device for making struts for automatic sprinklers, the combination with two decussated arms provided with extending jaws, of means for holding the members of said strut in contact between said jaws, and means for exerting a longitudinal pressure upon the members of said strut.

7. In a device for making struts for automatic sprinklers, the combination with two decussated arms provided with extending jaws, and means for holding the members of said strut between said jaws, of a slot in the lower of said jaws, a lever pivoted in said slot, with its upper end arranged to contact with one end of said strut, and a spring attaching the lower end of said lever to the arm carrying the upper jaw.

8. In a device for making struts for automatic sprinklers, the combination with two decussated arms provided with extending jaws, of a limited area on each of said jaws in contact with the members of said strut, and means for exerting a longitudinal pressure on the members of said strut.

9. A device for making struts for automatic sprinklers, comprising a pair of jaws for holding the members of said strut between them, said jaws having a limited area in contact with said strut, means for closing said jaws, and means for exerting a longitudinal pressure upon the members of said strut during the closing of said jaws.

10. In a device for making struts for automatic sprinklers, the combination with a support for one member of said strut, said support having its area of contact with said member reduced, of means for applying a pressure at right angles to the plane of said support upon the other member of said strut in contact with said first member, said means for applying pressure also having a reduced area of contact with said second member, and means for exerting a longitudinal pressure upon said strut.

GEORGE I. ROCKWOOD.

Witnesses:
PENELOPE COMBERBACH,
RUFUS B. FOWLER.